US012755369B2

(12) United States Patent
Sturlesi et al.

(10) Patent No.: US 12,755,369 B2
(45) Date of Patent: Oct. 6, 2026

(54) MACHINE LEARNING BASED DEFECT EXAMINATION FOR SEMICONDUCTOR SPECIMENS

(71) Applicant: Applied Materials Israel Ltd., Rehovot (IL)

(72) Inventors: Boaz Sturlesi, Tel-Aviv (IL); Noam Tal, Kiryat Ono (IL); Sergey Sinitsa, Holon (IL)

(73) Assignee: Applied Materials Israel Ltd., Rehovot (IL)

( * ) Notice: Subject to any disclaimer, the term of this patent is extended or adjusted under 35 U.S.C. 154(b) by 324 days.

(21) Appl. No.: 18/244,857

(22) Filed: Sep. 11, 2023

(65) Prior Publication Data

US 2025/0086781 A1 Mar. 13, 2025

(51) Int. Cl.

| | |
|---|---|
| ***G06T 7/00*** | (2017.01) |
| ***G06N 3/0455*** | (2023.01) |
| ***G06N 3/047*** | (2023.01) |
| ***G06N 3/0475*** | (2023.01) |
| ***G06T 7/11*** | (2017.01) |
| ***G06V 10/82*** | (2022.01) |

(52) U.S. Cl.

CPC ................ *G06T 7/001* (2013.01); *G06T 7/11* (2017.01); *G06T 2207/20076* (2013.01); *G06T 2207/20081* (2013.01); *G06T 2207/30148* (2013.01)

(58) Field of Classification Search

CPC . G06T 7/001; G06T 7/11; G06T 2207/20076; G06T 2207/20081; G06T 2207/30148

See application file for complete search history.

(56) References Cited

U.S. PATENT DOCUMENTS

2015/0003721 A1* 1/2015 Pettibone ................ G06T 7/001 382/149
2019/0287230 A1* 9/2019 Lu ......................... G06T 7/0004
(Continued)

OTHER PUBLICATIONS

Ghosh, Partha, et al. "From variational to deterministic autoencoders." arXiv preprint arXiv: 1903.12436, published 2019 (Year: 2019).*
(Continued)

*Primary Examiner* — Oneal R Mistry
*Assistant Examiner* — Nhut Huy Pham
(74) *Attorney, Agent, or Firm* — Lowenstein Sandler LLP

(57) ABSTRACT

There is provided a system and method of defect examination on a semiconductor specimen. The method comprises obtaining a runtime image of the semiconductor specimen; generating a reference image based on the runtime image using a machine learning (ML) model; and performing defect examination on the runtime image using the generated reference image. The ML model is previously trained alternately between two training modes using a training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution, the PV distribution being learnt by the ML model based on PVs observed across the training set.

18 Claims, 6 Drawing Sheets

(56) References Cited

U.S. PATENT DOCUMENTS

| | | | | |
|---|---|---|---|---|
| 2024/0112052 | A1* | 4/2024 | Barr | G06N 20/00 |
| 2025/0104210 | A1* | 3/2025 | Pu | G03F 7/706841 |

OTHER PUBLICATIONS

Sumathi, M., and R. Barani. "Qualitative evaluation of pixel level image fusion algorithms." International Conference on Pattern Recognition, Informatics and Medical Engineering (PRIME-2012). IEEE, 2012. (Year: 2012).*

Kim, Minsu, et al. "Weakly-supervised defect segmentation on periodic textures using CycleGAN." IEEE, 2020. (Year: 2020).*

Reddit ("VAE and autoencoder" Reddit.com, https://www.reddit.com/r/deeplearning/comments/mmmswx/vae_and_autoencoder/?rdt=55805) (Year: 2021).*

Utkin, Lev, et al. "Combining an autoencoder and a variational autoencoder for explaining the machine learning model predictions." IEEE, 2021 (Year: 2021).*

Ghosh, Partha, et al. "From variational to deterministic autoencoders." arXiv preprint arXiv: 1903.12436 (Year: 2019).*

* cited by examiner

MACHINE LEARNING BASED DEFECT EXAMINATION FOR SEMICONDUCTOR SPECIMENS

TECHNICAL FIELD

The presently disclosed subject matter relates, in general, to the field of examination of a semiconductor specimen, and more specifically, to machine learning based defect examination applications of the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having a high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of defect examination on a semiconductor specimen, the system comprising a processing circuitry configured to: obtain a runtime image of the semiconductor specimen; generate a reference image based on the runtime image using a machine learning (ML) model, wherein the ML model is previously trained alternately between two training modes using a training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution, the PV distribution being learnt by the ML model based on PVs observed across the training set; and perform defect examination on the runtime image using the generated reference image.

In addition to the above features, the system according to this aspect of the presently disclosed subject matter can comprise one or more of features (i) to (xv) listed below, in any desired combination or permutation which is technically possible:

(i) The training set comprises one or more pairs of training images, each pair including a defective image as an input image and a corresponding nominal image as a target image, or two nominal images having different PVs respectively as an input image and a target image.

(ii) The training comprises, for a given pair of training images: in a stochastic mode, generating, by the ML model, a predicted reference image with a stochastic PV from a PV distribution based on the input image, and optimizing the ML model based on the predicted reference image with respect to the target image; and in a deterministic mode, generating, by the ML model, a predicted reference image with a predetermined PV selected from the PV distribution based on the target image, and optimizing the ML model based on the predicted reference image with respect to the target image.

(iii) The one or more pairs comprise at least a pair of a defective image and a nominal image corresponding to the defective image. The training comprises: in the stochastic mode, processing the defective image by the ML model to obtain a predicted reference image with a stochastic PV from the PV distribution, and optimizing the ML model to reduce a difference between the predicted reference image and the nominal image; and in the deterministic mode, processing the nominal image by the ML model to obtain a predicted reference image with a predetermined PV selected from the PV distribution and similar to the PV of the nominal image, and optimize the ML model to reduce a difference between the predicted reference image and the nominal image.

(iv) The defective image is a synthetic defective image generated by implanting a defect to the corresponding nominal image, the synthetic defective image being associated with ground truth of the implanted defect.

(v) The ML model comprises an encoder, a first decoder, and a second decoder connected to the encoder and the first encoder. The predicted reference image is obtained as output of the first encoder. The training further comprises: obtaining, as output of the second decoder, a segmentation map including a segment representative of defect presence, and optimizing the ML model based on the segmentation map with respect to the ground truth.

(vi) The one or more pairs comprise at least a pair of a first nominal image and a second nominal image having different PVs. The training comprises: in the stochastic mode, processing the first nominal image by the ML model to obtain a predicted reference image with a stochastic PV from the PV distribution, and optimizing the ML model to reduce a difference between the predicted reference image and the second nominal image; and in the deterministic mode, processing at least one nominal image of the first nominal image or the second nominal image by the ML model to generate at least one predicted reference image with a predetermined PV selected from the PV distribution and similar to the PV of the at least one nominal image, and optimizing the ML model to reduce a difference between the at least one predicted reference image and the at least one nominal image.

(vii) The ML model is a probabilistic generative model.

(viii) The stochastic PV is randomly selected from the PV distribution, and the predetermined PV is selected as a center of the PV distribution so as to be similar to a PV in a corresponding input image to the ML model.

(ix) The training in the stochastic mode enables the ML model to learn to recognize all PVs within the PV distribution as normal and differentiate defective features therefrom, and the training in the deterministic model enables the ML model to learn to generate a reference image with a PV similar to the PV of an input image.

(x) The reference image shares a similar PV as that of the runtime image. The processing circuitry is configured to perform the defect examination by directly comparing the runtime image with the reference image to obtain a defect examination result indicative of defect distribution on the semiconductor specimen. The defect examination result has reduced residual PVs and improved detection sensitivity.

(xi) The processing circuitry is configured to repeat the generation of a reference image using the ML model a plurality of times, to obtain a plurality of reference images with stochastic PVs, and generate a composite reference image based on the plurality of reference images, such that the composite reference image has a similar PV as that of the runtime image. The defect examination is performed on the runtime image using the composite reference image.

(xii) The composite image is generated by selecting, for each pixel, a smallest value of corresponding pixel values from the plurality of reference images.

(xiii) The processing circuitry is further configured to generate, using the ML model, a segmentation map for the runtime image, the segmentation map including a segment representative of defect presence.

(xiv) The ML model comprises an encoder, a first decoder, and a second decoder connected to the encoder and the first encoder. The reference image is obtained as output of the first encoder, and the segmentation map is obtained as output of the second decoder.

(xv) The one or more image pairs further comprise at least a pair of a nominal image and a synthetic defective image generated by implanting a defect to the nominal image.

In accordance with other aspects of the presently disclosed subject matter, there is provided a computerized method of defect examination on a semiconductor specimen, the method comprising: obtaining a runtime image of the semiconductor specimen; generating a reference image based on the runtime image using a machine learning (ML) model, wherein the ML model is previously trained alternately between two training modes using a training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution, the PV distribution being learnt by the ML model based on PVs observed across the training set; and performing defect examination on the runtime image using the generated reference image.

In accordance with other aspects of the presently disclosed subject matter, there is provided a computerized method of training a machine learning (ML) model usable for defect examination on a semiconductor specimen, the method comprising: obtaining a training set comprising one or more pairs of training images, each pair including an input image and a target image corresponding to the input image; and training the ML model alternately between two training modes using the training set, comprising, for a given pair of training images: in a stochastic mode, generating, by the ML model, a predicted reference image with a stochastic PV from a PV distribution based on the input image, and optimizing the ML model based on the predicted reference image with respect to the target image, wherein the PV distribution is derived based on variations observed across the training set; and in a deterministic mode, generating, by the ML model, a predicted reference image with a predetermined PV selected from the PV distribution based on the target image, and optimizing the ML model based on the predicted reference image with respect to the target image itself.

These aspects of the disclosed subject matter can comprise one or more of features (i) to (xv) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized method of defect examination on a semiconductor specimen, the method comprising: obtaining a runtime image of the semiconductor specimen; generating a reference image based on the runtime image using a machine learning (ML) model, wherein the ML model is previously trained alternately between two training modes using a training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution, the PV distribution being learnt by the ML model based on PVs observed across the training set; and performing defect examination on the runtime image using the generated reference image.

In accordance with other aspects of the presently disclosed subject matter, there is provided a non-transitory computer readable medium comprising instructions that, when executed by a computer, cause the computer to perform a computerized method of training a machine learning (ML) model usable for defect examination on a semiconductor specimen, the method comprising: obtaining a training set comprising one or more pairs of training images, each pair including an input image and a target image corresponding to the input image; and training the ML model alternately between two training modes using the training set, comprising, for a given pair of training images: in a stochastic mode, generating, by the ML model, a predicted reference image with a stochastic PV from a PV distribution based on the input image, and optimizing the ML model based on the predicted reference image with respect to the target image, wherein the PV distribution is derived based on variations observed across the training set; and in a deterministic mode, generating, by the ML model, a predicted reference image with a predetermined PV selected from the PV distribution based on the target image, and optimizing the ML model based on the predicted reference image with respect to the target image itself.

These aspects of the disclosed subject matter can comprise one or more of features (i) to (xv) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
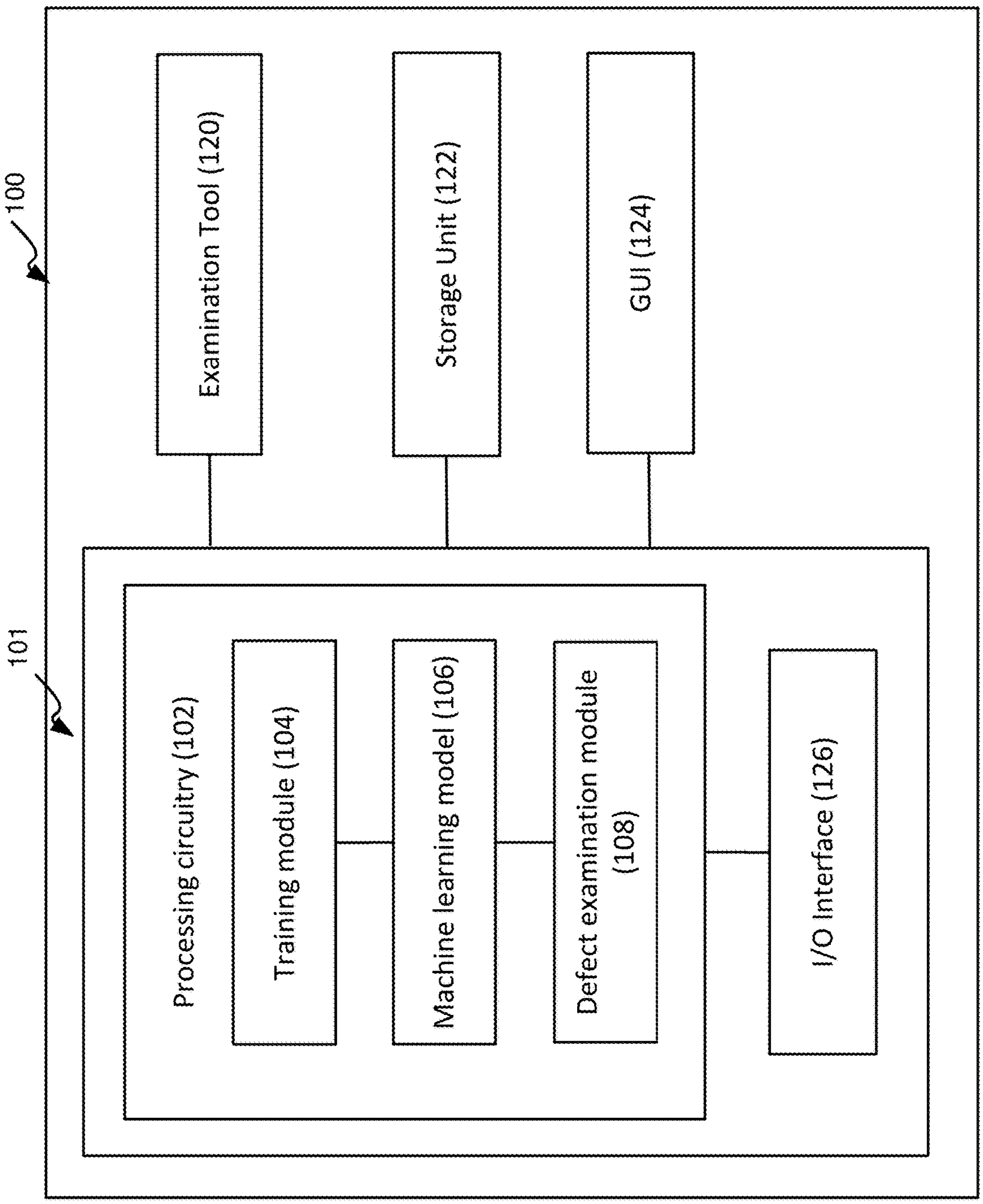
FIG. 1 illustrates a generalized block diagram of an examination system in accordance with certain embodiments of the presently disclosed subject matter.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination, can be performed at different processing steps/layers during the manufacturing process to monitor and control the process. The examination operations can be performed a multiplicity of times, for example after certain processing steps, and/or after the manufacturing of certain layers, or the like.

Various detection methods can be used for detecting defects on specimens. By way of example, a classic die-to-reference detection algorithm, such as, e.g., Die-to-Die (D2D), is typically used. In D2D, an inspection image of a target die is captured. For purpose of detecting defects in the inspection image, one or more reference images are captured from one or more reference dies (e.g., one or more neighboring dies) of the target die. The inspection image and the reference images are aligned and compared to each other. One or more difference images can be generated based on the difference between pixel values of the inspection image, and pixel values derived from the one or more reference images. A detection threshold is then applied to the difference maps, and a defect map indicative of defect candidates in the target die is created.

There are certain disadvantages with respect to the above-described die-to-reference detection methods. For example, the D2D method requires the acquisition of at least two images (i.e., in cases of one inspection image and one reference image) which doubles the image acquisition time of the inspection tool. In cases of using multiple references, it significantly increases the image acquisition time in accordance with the number of reference images. In addition, prior to comparison, the inspection image and reference images need to be registered. In some cases, they need additional pre-processing in order to compensate for noises representing the variations (such as, e.g., process variation and color variations) between the two images. These unavoidably increase the processing time of the detection methods, thus affect detection throughput (TpT). In addition, detection sensitivity may also be affected due to the residual variations and noises which were not eliminated by the pre-processing.

As semiconductor fabrication processes continue to advance, semiconductor devices are developed with increasingly complex structures with shrinking feature dimensions, which makes it more challenging for the conventional methodologies to provide satisfying examination performance.

Accordingly, certain embodiments of the presently disclosed subject matter propose to use a machine-learning based defect examination system, which does not have one or more of the disadvantages described above. The present disclosure proposes to generate a synthetic reference image using a machine learning (ML) model instead of additional acquisition of an actual reference image, and use the generated reference image to perform defect examination operations in runtime. The proposed runtime examination system significantly reduces the image acquisition time of the tool and eliminates image pre-processing efforts such as image registration and noise filtration, thereby improving detection throughput and defect detection sensitivity. Specifically, the ML model is trained in a specific manner so as to be able to generate a reference image having a high probability of being defect-free while sharing a similar PV as that of the runtime image. Such a reference image, when being used in comparison with the runtime image, can result in an improved difference map, where residual noises caused by process variations are significantly reduced, thus improving defect detection sensitivity, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools 120 can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., scanning electron microscopy (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

According to certain embodiments of the presently disclosed subject matter, the examination system 100 comprises a computer-based system 101 operatively connected to the examination tools 120 and capable of automatic defect examination on a semiconductor specimen in runtime based on runtime images obtained during specimen fabrication. System 101 is also referred to as a defect examination system.

System 101 includes a processing circuitry 102 operatively connected to a hardware-based I/O interface 126 and configured to provide processing necessary for operating the system, as further detailed with reference to FIGS. 2-6. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

According to certain embodiments of the presently disclosed subject matter, system 101 can be a runtime defect examination system configured to perform defect examination operations using a trained machine learning (ML) model based on runtime images obtained during specimen fabrication. In such cases, one or more functional modules comprised in the processing circuitry 102 of system 101 can include a ML model 106 that was previously trained for generating a reference image, and a defect examination module 108.

Specifically, the processing circuitry 102 can be configured to obtain, via an I/O interface 126, a runtime image of a semiconductor specimen acquired by an examination tool, and provide the runtime image as an input to a machine learning model (e.g., the ML model 106) to process. The ML model 106 can generate a reference image based on the runtime image. The ML model 106 is previously trained during a setup/training phase using a training set. Specifically, the ML model is trained alternately between two training modes: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution. The PV distribution is learnt by the ML model based on PVs observed across the training set. The defect examination module 108 can be configured to perform defect examination on the runtime image using the generated reference image.

In such cases, the ML model 106 and defect examination module 108 can be regarded as part of a defect examination recipe usable for performing runtime defect examination operations on acquired runtime images. System 101 can be regarded as a runtime defect examination system capable of performing runtime defect-related operations using the defect examination recipe. Details of the runtime examination process are described below with reference to FIG. 5.

In some embodiments, system 101 can be configured as a training system capable of training the ML model during a training/setup phase using a specific training set. In such cases, one or more functional modules comprised in the processing circuitry 102 of system 101 can include a training module 104 and a ML model 106 to be trained. Specifically, the training module 104 can be configured to obtain a training set comprising one or more pairs of training images, each pair including an input image and a target image corresponding to the input image.

The training module 104 can be configured to train the ML model 106 using the training set. Specifically, the ML model can be trained alternately between two training modes: a stochastic mode, and a deterministic mode. In the stochastic mode, for a given pair of training images, the ML model can process the input image and generate a predicted reference image with a stochastic PV from a PV distribution. The ML model can be optimized based on the predicted reference image with respect to the target image. The PV distribution can be learnt by the ML model based on PVs observed across the training set. In the deterministic mode, the ML model can generate a predicted reference image with a predetermined PV selected from the PV distribution based on the target image, and optimize the ML model based on the predicted reference image with respect to the target image itself.

As described above, the ML model, upon being trained, is usable for generating a reference image for a runtime image. Details of the training process are described below with reference to FIGS. 2-4 and 6.

Operation of systems 100 and 101, the processing circuitry 102, and the functional modules therein will be further detailed with reference to FIGS. 2-6.

According to certain embodiments, the ML model 106 referred to herein can be implemented as various types of machine learning models. In some cases, the ML model can be implemented as a probabilistic generative model, such as, e.g., variational auto-encoder (VAE), Generative Adversarial Network (GAN), and Bayesian network, etc., or ensembles/combinations thereof. The learning algorithm used by the ML model can be any of the following: supervised learning, unsupervised learning, self-supervised, or semi-supervised learning, etc. The presently disclosed subject matter is not limited to the specific type of ML model or the specific type of learning algorithm used by the ML model.

In some embodiments, the ML model can be implemented as a deep neural network (DNN). DNN can comprise multiple layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a deep neural network and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as processing the runtime image, and performing defect examination, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., defect detection module, Automatic Defect Review Module (ADR), Automatic Defect Classification Module (ADC), metrology operation module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the trained ML model, the generated reference image, the defect examination result, can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime images, the training set, as described above. Accordingly, these input data can be retrieved from the storage unit 122 and provided to the processing circuitry 102 for further processing. The output of the system 101, such as, e.g., the trained ML model, the generated reference image, the defect examination result, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the generated reference image, the defect examination result, etc., on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime defect examination system using the trained ML model. The training system and the runtime examination system can be located at the same entity (in some cases hosted by the same device), or distributed over different entities, depending on specific system configurations and implementation needs.

In some examples, certain components utilize a cloud implementation, e.g., implemented in a private or public cloud. Communication between the various components of the examination system, in cases where they are not located entirely in one location or in one physical entity, can be realized by any signaling system or communication components, modules, protocols, software languages and drive signals, and can be wired and/or wireless, as appropriate.

It should be further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-6. Likewise, the methods described with respect to FIGS. 2-6 and their possible implementations can be implemented by systems 101 and 100. It is therefore noted that embodiments discussed in relation to the methods described with respect to FIGS. 2-6 can also be implemented, mutatis mutandis as various embodiments of the systems 101 and 100, and vice versa.

Figure 2:
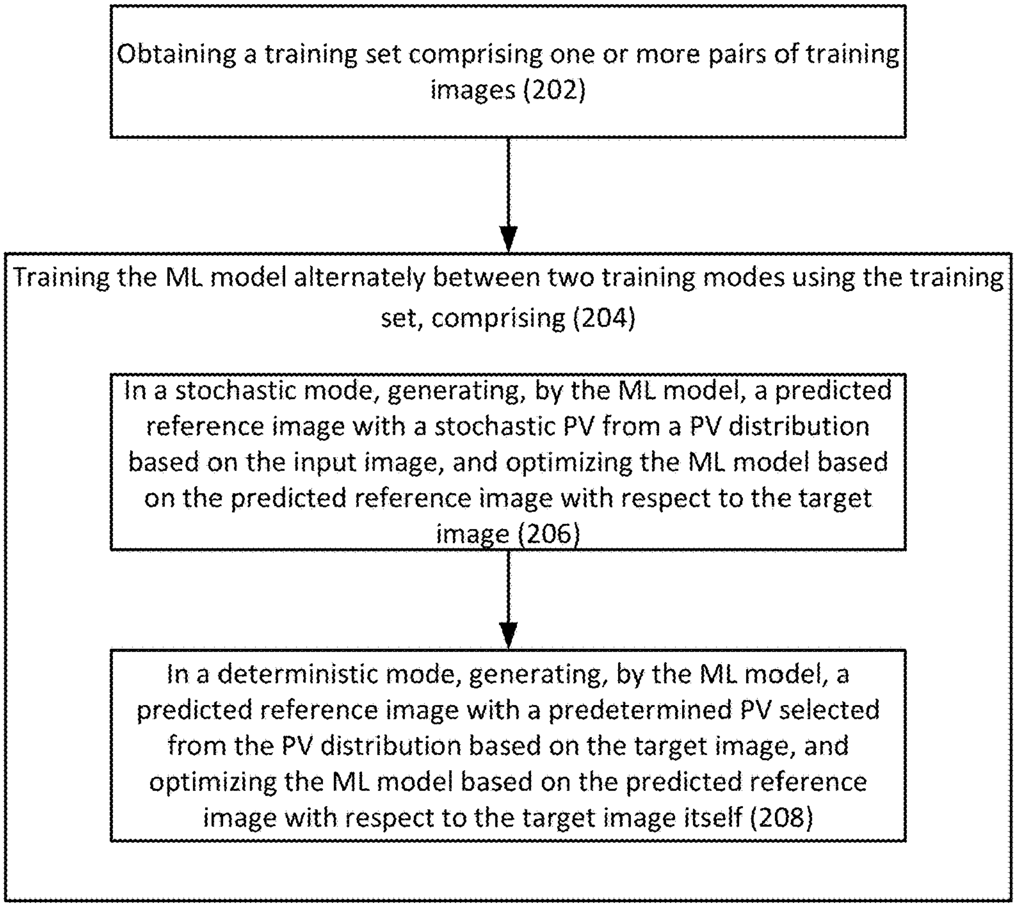
FIG. 2 illustrates a generalized flowchart of training a machine learning model usable for defect examination on a semiconductor specimen in accordance with certain embodiments of the presently disclosed subject matter.

Referring to FIG. 2, there is illustrated a generalized flowchart of training a machine learning model usable for defect examination on a semiconductor specimen in accordance with certain embodiments of the presently disclosed subject matter.

A training set can be obtained (202) (e.g., by the training module 104 in processing circuitry 102), comprising one or more pairs of training images. Each pair includes an input image and a target image corresponding to the input image. In the stochastic mode, the input image generally refers to the image to be fed to the ML model as the input to be processed, and the target image refers to the image used for comparison with a predicted image by the ML model for purpose of optimizing the ML model. In the deterministic mode, depending on the composition of a training image pair, the target image which is a nominal image in the training image pair is used as both the input image and the target image, as will be detailed below.

By way of example, a pair of training images can include a defective image as the input image and a corresponding nominal image as the target image. A defective image used herein refers to an image that comprises, or has a high probability of comprising, defective features representative of actual defects on a specimen. A nominal image is also referred to as a defect-free image, which is a clean image free of defective features, or has a high probability of not comprising any defective features. The nominal image corresponds to the defective image in a sense that it captures a similar region containing similar patterns as those of the defective image. Trained using such image pairs, the ML model can learn a non-linear mapping relationship between the two populations of defective images and nominal images.

By way of another example, a pair of training images can include two nominal images having different pattern variations respectively serving as the input image and the target image. The pattern variations (PVs) referred to herein should be broadly construed to include different variations, deviations, or distortions related to any pattern, structure, or image, such as, e.g., bent lines, edge roughness, surface roughness, CD variation/shift, missing pattern, and gray level variation, etc. It is to be noted that the pattern variation referred to herein should not be limited to any specific size or resolution. There may be considered a presence of "variation" if one or more measurements and/or detections indicate that one or more characteristics of a design formed on the specimen are outside of a desired range of values for those one or more characteristics.

The PVs can be caused by all kinds of variations, such as, e.g., process variations. Process variation can refer to variations caused to a specimen by changes in the fabrication process of the specimen. By way of example, the fabrication process may cause slight shifting/scaling/distortion of certain structures/patterns between different inspection images which results in pattern variations in the images. By way of another example, the fabrication process may cause thickness variation of the specimen, which affects reflectivity, thus in turn affecting gray level of the resulting inspection images. For instance, die-to-die material thickness variation can result in a different reflectivity between two of the dies, which leads to a different background gray level value for the images of the two dies. Two images having different PVs referred to in the present disclosure means that the two images, although capturing similar patterns, may have presence of different levels of PVs caused by the effects of process variations.

In some cases, the training set used to train the ML model can comprise one or more pairs of training images, each including a defective image and a corresponding nominal image, as described above. In some cases, the training set can comprise one or more pairs of training images, each including two nominal images having different PVs, as described above. In some further cases, the training set used to train the ML model can comprise both types of training image pairs, in any suitable combination.

In some cases, the training images, such as the defective image and the nominal image in a pair, can be "real world" images (i.e., actual images) of a semiconductor specimen acquired by an examination tool during a fabrication process of the specimen. By way of example, the defective image can be an inspection image that the tool captures from an inspection area of a specimen, which is verified as containing a defective feature. For instance, the inspection image can be verified as a defective image containing a defective feature in a defect detection process (in which case it is regarded as a defective image having high probability of containing a defective feature), or in a defect review process, e.g., either in a manual review by a user, or an automatic review by an ADR process. The nominal image can be captured by the tool from one or more reference areas of the inspection area (such as, e.g., one or more neighboring dies of an inspection die in D2D inspection) which are known to be defect-free, or have a high probability of being defect-free. The nominal image can also be any inspection image which is verified as not containing any defective features.

In some embodiments, in addition to the "real world" training images, the training set used to train the ML model can be enriched by using one or more synthetic images simulated for the semiconductor specimen. By way of example, a defective image can be simulated by synthetically implanting a defective feature on a nominal image. Various ways of image augmentation for implanting a synthetic defect on an image based on certain characteristics of the defect, such as, e.g., the type, size, and expected locations etc., can be used, and the present disclosure is not limited to a specific implementation. In such cases, the training set used to train the ML model can further comprise one or more pairs of training images, each pair including a nominal image and a synthetic defective image generated by implanting a synthetic defect to the nominal image. As the defect is implanted, the defect characteristics of the implanted defect, such as, e.g., type, size, location in the image, and type, are all known, which can be used as ground truth for the synthetic defect image. Such image pairs can be used alone or in combination with the above-described image pairs, as will be described below in further detail.

Continuing with the description of FIG. 2, the ML model can be trained (204) (e.g., by the training module 104 in processing circuitry 102) alternately between two training modes using the training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution. The PV distribution can be derived based on the pattern variations observed across the training set, and can be learnt by the ML model during training.

Specifically, the training of the ML model comprises, for a given pair of training images: in the stochastic mode, generating (206), by the ML model, a predicted reference image with a stochastic PV from a PV distribution based on the input image, and optimizing the ML model based on the predicted reference image with respect to the target image; and in the deterministic mode, generating (208), by the ML model, a predicted reference image with a predetermined PV selected from the PV distribution based on the target image (note that in cases of an image pair having two nominal images, either image can be regarded as the target image, while the other image as the corresponding input image), and optimizing the ML model based on the predicted reference image with respect to the target image itself. A reference image used herein refers to a nominal/defect-free image that is free of defective features, or has a high probability of not comprising any defective features, such that it can be used as a reference for a corresponding defective image for purpose of defect examination.

Figure 3:
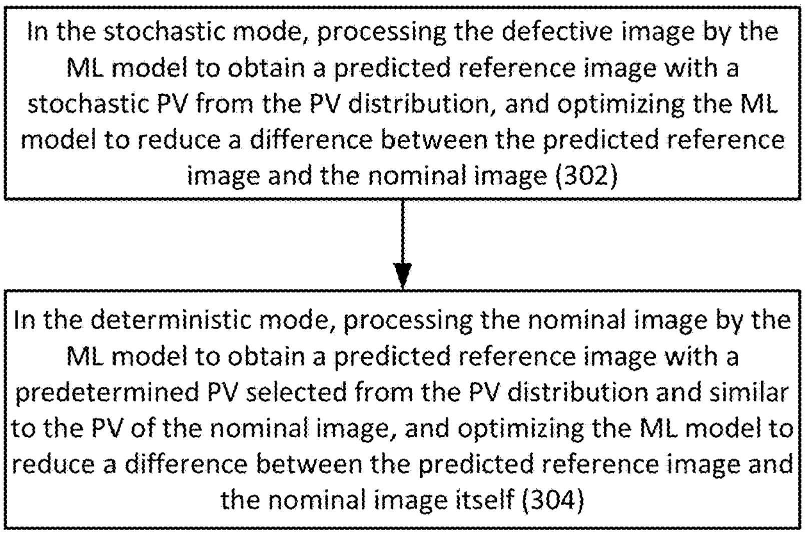
FIG. 3 illustrates a generalized flowchart of training the ML model using an image pair of a defective image and a corresponding nominal image in accordance with certain embodiments of the presently disclosed subject matter.

Referring to FIG. 3, there is illustrated a generalized flowchart of training the ML model using an image pair of a defective image and a corresponding nominal image in accordance with certain embodiments of the presently disclosed subject matter.

Specifically, in the stochastic mode, the defective image can be provided as the input to the ML model. The defective image can be processed (302) by the ML model to obtain a predicted reference image with a stochastic PV from the PV distribution. The nominal image is used as the target image. The ML model can be optimized to reduce a difference between the predicted reference image and the nominal image.

In the deterministic mode, the nominal image in the image pair can be used as both the input image and the target image. The nominal image can be processed (304) by the ML model to obtain a predicted reference image with a predetermined PV selected from the PV distribution and similar to the PV of the nominal image. The ML model can be optimized to reduce a difference between the predicted reference image and the nominal image itself.

Figure 7:
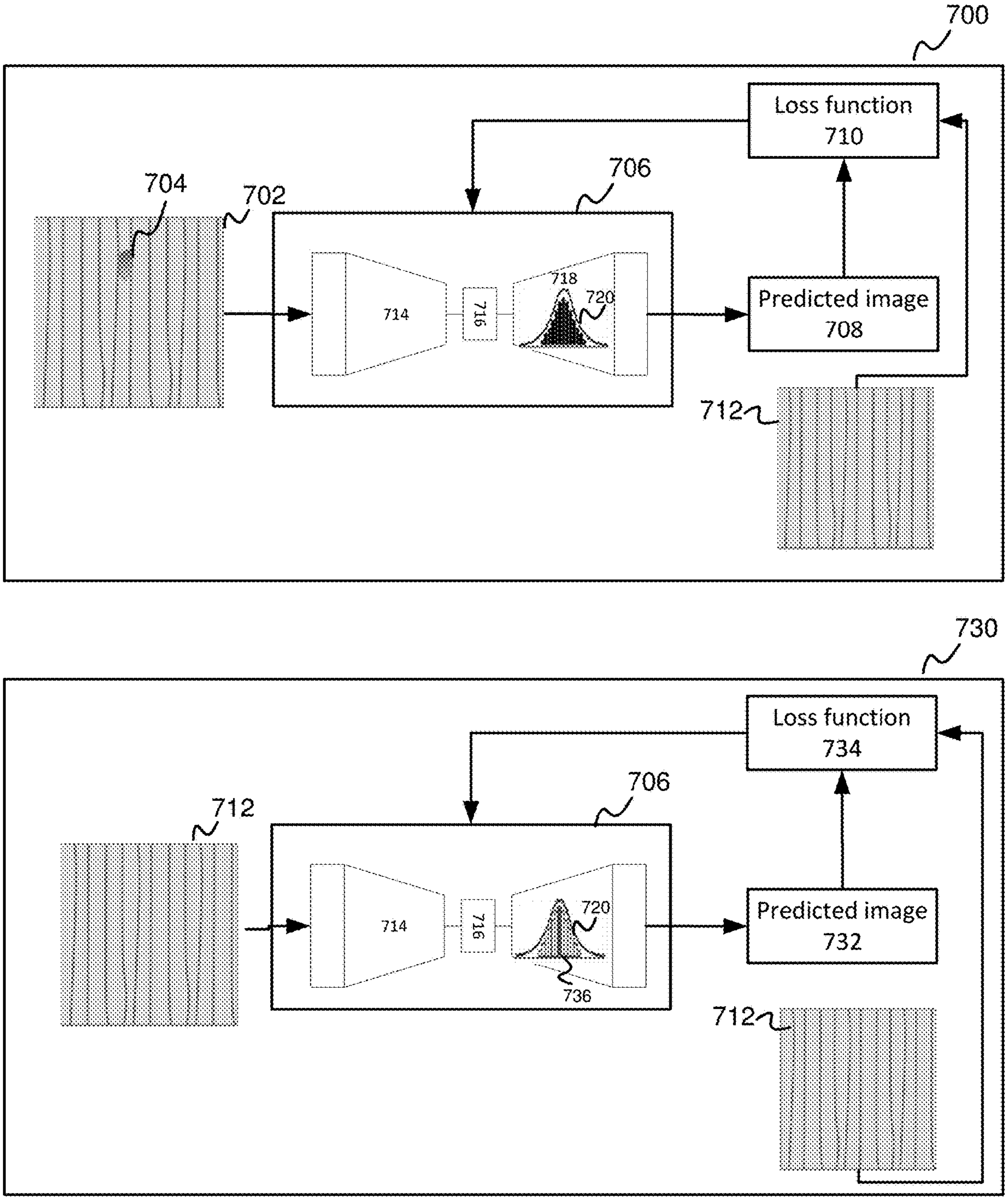
FIG. 7 illustrates a schematic illustration of the training process in the stochastic mode and deterministic mode using an image pair of a defective image and a corresponding nominal image in accordance with certain embodiments of the presently disclosed subject matter.

FIG. 7 is a schematic illustration of the training process in the stochastic mode and deterministic mode using an image pair of a defective image and a corresponding nominal image in accordance with certain embodiments of the presently disclosed subject matter.

Block 700 illustrates the stochastic mode of the training process using an image pair of a defective image 702 and a corresponding nominal image 712. As shown, the defective image 702 having a defective feature 704 is provided as the input to the ML model 706 to be processed. The output of the ML model 706 is a predicted reference image 708. The predicted image 708 is evaluated with respect to the nominal image 712 in the image pair using a loss function 710. By way of example, the loss function 710 can include a reconstruction loss which can be represented by, e.g., a difference metric representing a difference between the predicted reference image and the nominal image. The ML model 706 can be optimized by reducing/minimizing the value of the loss function 710. By way of example, the ML model 706 can be optimized using a loss function such as, e.g., Mean squared error (MSE), Sum of absolute difference (SAD), structural similarity index measure (SSIM), or an edge-preserving loss function. It is to be noted that the term "minimize" or "minimizing" used herein refers to an attempt to reduce a difference value represented by the loss function to a certain level/extent (which can be predefined), but not necessarily having to reach the actual minimum.

As described above, the ML model 706 can be implemented as various types of learning models. In some embodiments, the ML model can be implemented as a probabilistic generative model, such as, e.g., variational auto-encoder (VAE), GAN, and Bayesian model, etc. Taking the VAE as an example for illustration, VAE is a variation of an autoencoder, which is a type of neural network commonly used for the purpose of data reproduction by learning efficient data coding and reconstructing its inputs (e.g., by minimizing the difference between the input and the output). An autoencoder typically has an input layer, an output layer, and one or more hidden layers connecting them. Generally, an autoencoder can be regarded as including two components, the encoder and the decoder. The autoencoder learns to encode data from an input layer into a short code (i.e., the encoder), and then decode that code into an output that closely matches the original data (i.e., the decoder component). The output of the encoder is referred to as code, latent variables, or latent representation in a latent space representative of the input image. The code can pass the hidden layers in the decoder and can be reconstructed to an output image corresponding to the input image in the output layer.

VAE differs from an autoencoder mainly in that VAE aims to learn the underlying probability distribution of the training data, e.g., by learning a low-dimensional latent representation of the training data referred to as latent variables, such that it could sample new data from the learned distribution during inference. In other words, the latent space of a VAE (in cases of deep or very deep VAEs, also some of the sampling layers in the decoder) can represent a range of possible values for latent variables, rather than a fixed set of values as in the latent space of an autoencoder. In such ways, the VAE can produce/generate multiple different samples that all come from the same distribution.

Specifically, as exemplified in block 700, the encoder 714 of the VAE 706 can be configured to map the input image (e.g., the defective image 702) to latent variables in a latent space 716 representing respective features from the input image. The VAE can also model the probability distribution of these features, thereby allowing to visualize different levels of pattern variations impacting the features. The probability distribution of different features across the training set can be learnt by the VAE during training. By way of example, a PV distribution 720 (such as, e.g., a normal distribution) representative of pattern variations of different features of the images (which can be represented by, e.g., a latent vector) in the training set can be learnt by the ML model during training. The PV distribution 720 can be derived in different manners based on different VAE network structures and configurations. By way of example, in a classical VAE network, the PV distribution 720 can be provided by the latent space 716. By way of another example, in relatively deep VAEs, the PV distribution 720 can be provided as an overall distribution based on a distribution from the latent space 716 and multiple distributions from multiple decoder layers in the decoder 718.

In block 700, the ML model 706 is trained in the stochastic mode, where the ML model is configured to generate a predicted reference image with a stochastic PV from the PV distribution 720, i.e., each time the ML model generates a predicted image 708 with a PV randomly selected from the PV distribution. The ML model can be optimized by reducing the difference between the predicted reference image 708 and the target image, e.g., the nominal image 712 in this case, as described above. As the predicted reference images are generated with various PVs randomly selected from the PV distribution, training the ML model in the stochastic mode can enable the ML model to learn that all PVs, as long as they are within the PV distribution, should be recognized as normal, whereas defective features should be differentiated from all PVs and be recognized as abnormal.

In some embodiments, the VAE can be trained using a loss function that includes two terms: a reconstruction loss which evaluates the difference between the input image and the target image, as exemplified above with respect to the loss function 710, and a regularization loss, which encourages the probability distribution in the latent space to be a normal distribution. In such cases, the loss function 710 should be regarded as comprising both terms.

Block 730 illustrates the deterministic mode of the training process, where the ML model 706 is configured to generate a predicted reference image with a predetermined PV selected from the PV distribution 720. By way of example, in some cases, the predetermined PV can be selected as the peak 736 of the PV distribution 720, which represents the most likely level of PV in the input image. In other words, each time the ML model generates a predicted image 732 with a fixed level of PV similar to the PV of the input image. In such cases, the ML model 706 actually operates as an autoencoder, which provides a predicted output based on fixed values of latent variables, instead of probability distributions thereof.

As shown, the nominal image 712 in the image pair is provided as the input to the ML model 706 to be processed. The output of the ML model 706 is a predicted reference image 732. The predicted image 732 is evaluated with respect to the nominal image 712 itself using a loss function 734. By way of example, the loss function 734 can include a reconstruction loss which can be represented by, e.g., a difference metric representing a difference between the predicted reference image and the nominal image. The ML model 706 can be optimized by reducing/minimizing the value of the loss function 734.

As an autoencoder, the ML model 706 is trained and optimized so as to learn the representative features in the input nominal images. As the predicted images are generated with a predetermined PV, the ML model 706 is learnt to generate a reference image with a PV similar to the level of PV of the input image.

The ML model can be trained in any suitable alternate manner between the two modes, and the present disclosure is not limited to the specific order and/or the number of training iterations in each mode. By way of example, in some cases, for a given image pair, the training of the ML model can start with the stochastic mode for one or more iterations, and then alternates to the deterministic mode, or, alternatively, it can be done the other way around. In some cases, a batch of image pairs can be used to train the ML model in one mode first, and then switch to the other mode.

Figure 4:
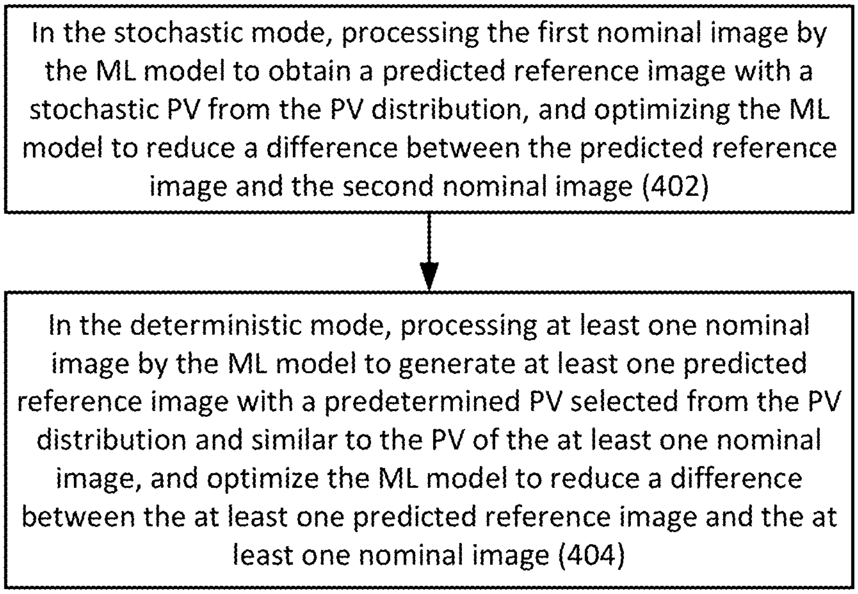
FIG. 4 illustrates a generalized flowchart of training the ML model using an image pair of two nominal images in accordance with certain embodiments of the presently disclosed subject matter.

Turning now to FIG. 4, there is illustrated a generalized flowchart of training the ML model using an image pair of two nominal images in accordance with certain embodiments of the presently disclosed subject matter.

As described above, when using an image pair of two nominal images (e.g., a first nominal image and a second nominal image) with different PVs to train the ML model in the stochastic mode, either nominal image can be used as the input image to the ML model, while the other one can be used as the target image. Specifically, a first nominal image is provided as the input to the ML model. The first nominal image can be processed (402) by the ML model to obtain a predicted reference image with a stochastic PV from the PV distribution. The second nominal image is used as the target image. The ML model can be optimized to reduce a difference between the predicted reference image and the second nominal image.

As mentioned above, the ML model works as a VAE in the stochastic mode. Each time the ML model will generate a predicted image with a PV randomly selected from the PV distribution. As the predicted reference images are generated with various random PVs from the PV distribution, training the ML model in the stochastic mode can enable the ML model to learn that all these PVs, as long as they are within the PV distribution, should be recognized as normal behaviors.

In the deterministic mode, the ML model works as an auto-encoder. Either of the nominal images can be used as both the input image and the target image. By way of example, at least one nominal image of the first nominal image and the second nominal image can be processed (404) by the ML model to generate at least one predicted reference image with a predetermined PV selected from the PV distribution and similar to the PV of the nominal image. The ML model can be optimized to reduce a difference between the at least one predicted reference image and the at least one nominal image itself. As described above, the predetermined PV can be selected as the peak/center of the PV distribution, which represents the most likely level of PV in the input image. In other words, each time the ML model aims to generate a predicted image with a fixed level of PV similar to the PV of the input image.

It is to be noted that the training set used to train the ML model can be composed of any combination of the two types of image pairs. By way of example, in some cases, the training set can include only image pairs of corresponding defective and nominal images. In some other cases, the training set can include only image pairs of two nominal images. In further cases, the training set can include both types of image pairs with any suitable number of each type. The ML model can be trained using the training set in any suitable alternate manner between the two modes, as described above. By using the alternate training, the ML model can learn to recognize all PVs as normal behaviors, thereby differentiating the defective features from the normal behaviors. In addition, for a given input image, the model can learn to generate a reference image with similar PV with respect to the input image.

The ML model, once trained in this specific manner and deployed in inference, can effectively remove defective features from a runtime image, and generate a reference image having same PV as the runtime image. Such a reference image, when being used in comparison with the runtime image, can result in an improved difference map where residual noises caused by process variations are significantly reduced, thus improving defect detection sensitivity.

According to certain embodiments, optionally, the one or more image pairs in the training set can comprise at least a pair of a nominal image and a synthetic defect image generated by implanting a synthetic defect to the nominal image. By way of example, in the image pair of a defective image and a nominal image, as described above with reference to FIG. 3, the defective image can be a synthetic defect image generated by implanting a synthetic defect to the nominal image.

Defects can be implanted into a nominal image in various ways. By way of example, defects can be implanted directly on an actual nominal image. For instance, an image patch containing a defective feature can be directly integrated into a nominal image based on certain defect characteristics, such as the type and size of the defective feature, as well as the target location(s) in the nominal image to be implanted. One or more image characteristics of the image patch can be manipulated before being pasted in the nominal image. By way of example, the manipulation can be based on the following: geometric transformation, gray level intensity modifications, filtration, style transfer, and contrast modifications, etc. By way of another example, in some cases, defects can be first implanted into design data, and a synthetic defective image can be simulated based on the design data with implanted defects. The present disclosure is not limited to the specific way of defect implantation to generate the synthetic defective mage.

The synthetic defective image generated as such is naturally associated with ground truth information of the implanted defect, such as, e.g., the location, type, and size of the implanted defect in the synthetic defective image. The synthetic defective image and the ground truth information can be used to train a ML model for defect detection. In such cases, the ML model can further comprise a second decoder which acts as a segmentation head, in addition to the first decoder which provides an output of a predicted reference image as described above. In other words, the ML model can be constructed as comprising an encoder and a first decoder, and a second decoder respectively connected to the encoder and the first decoder.

Figure 6:
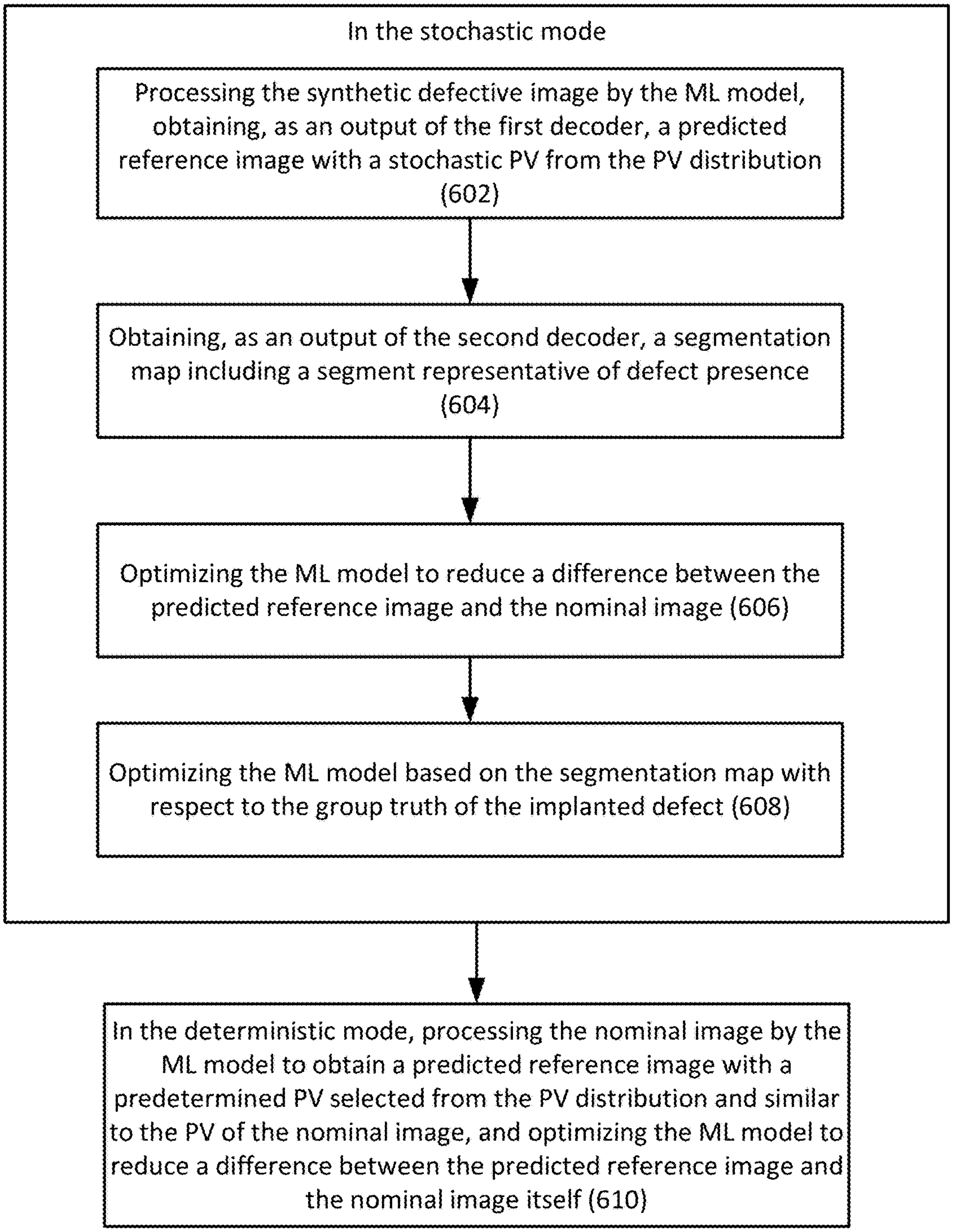
FIG. 6 illustrates a generalized flowchart of training a ML model with two decoders in accordance with certain embodiments of the presently disclosed subject matter.

FIG. 6 illustrates a generalized flowchart of training a ML model with two decoders in accordance with certain embodiments of the presently disclosed subject matter.

When using an image pair of a nominal image and a synthetic defect image generated by implanting a synthetic defect to the nominal image to train the ML model, the training process is similar to the process described with reference to FIG. 3, with additional processing steps, as described below.

In the stochastic mode, the synthetic defective image is provided as the input to the ML model. The synthetic defective image is processed (602) by the ML model (e.g., by the encoder and the first decoder), and a predicted reference image with a stochastic PV from the PV distribution can be obtained as the output of the first decoder. In addition, a segmentation map can be obtained (604), as the output of the second decoder (e.g., the segmentation head), the segmentation map including a segment representative of defect presence in the input image.

Figure 8:
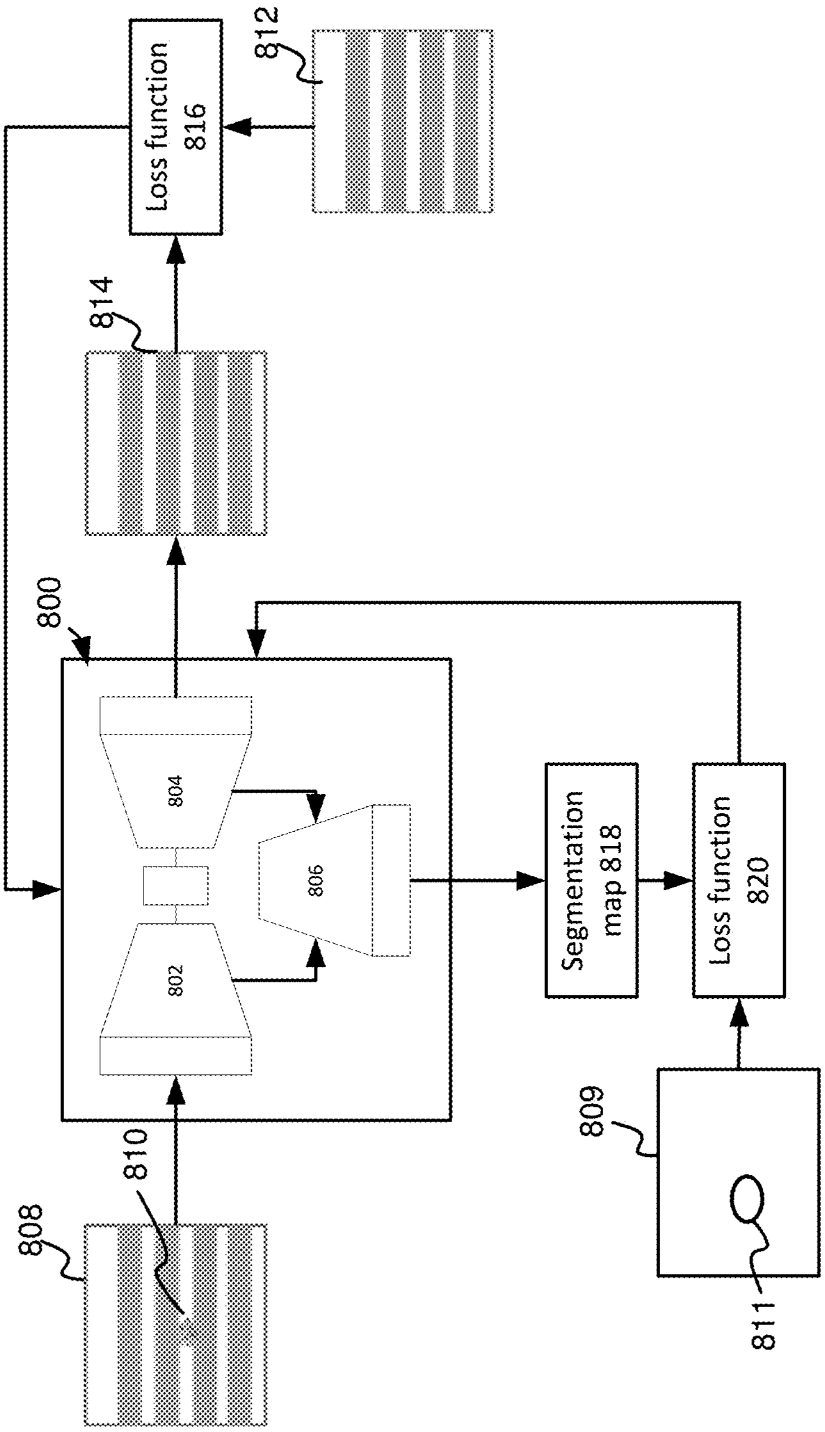
FIG. 8 schematically illustrates a training process of a ML model with two decoders using an image pair of a nominal image and a synthetic defect image in accordance with certain embodiments of the presently disclosed subject matter.

FIG. 8 illustrates a ML model 800 comprising an encoder 802, a first decoder 804, and a second decoder 806 (also referred to as a segmentation head) operatively connected to both the encoder and the first decoder. A synthetic defective image 808 is generated by implanting a defect 810 into a nominal image 812. A training image pair is formed including the synthetic defective image 808 and the nominal image 812. The synthetic defective image 808 is provided as the input to the ML model 800 to be processed. Specifically, the input is processed in two paths within the ML model 800. It is first processed in the path of the encoder 802 and the first decoder 804, to generate, as the output of the first decoder 804, a predicted reference image 814.

When the input is processed through the layers in the ML model, certain layers of the encoder and the first decoder can provide layer output in the form of, e.g., feature maps. For instance, in cases of a VAE with a convolutional encoder and decoder, the output of each layer can be represented as a 2D output feature map. The feature maps get smaller in size as they progress through the encoder, and get larger in size as they progress through the decoder. The output feature maps can be generated, e.g., by convolving each filter of a specific layer across the width and height of the input feature maps, and producing a two-dimensional activation map which gives the responses of that filter at every spatial position. Stacking the activation maps for all filters along the depth dimension forms the full output feature maps of the specific layer. The output feature maps of each layer in the encoder and decoder can be used to represent the features that are being learned by the VAE.

In some embodiments, the second decoder 806 can collect the outputs from the layers in the encoder 802 and the first decoder 804, such as, e.g., the output feature maps derived from the layers thereof, and generate the segmentation map 818 based on the collected outputs.

In some cases, the segmentation map 818 can be generated at pixel level, where each value in the segmentation map corresponds to a pixel in the input image and represents the segment that the corresponding pixel belongs to. In some other cases, the segmentation map can be generated at a structure level or a region level, where each value in the segmentation map corresponds to a structure or a region in the input image and represents the segment that the corresponding structure or region belongs to. The segments can include a defective segment (representative of presence of defect) and a non-defective segment. In some cases, the defective segment can further indicate the type of defect presented in the segment.

The ML model can be optimized based on the two outputs. Specifically, a first loss function 816 can be used to evaluate the difference between the predicted reference image 814 and the nominal image 812, and the ML model can be optimized (606) to reduce the difference indicated by the first loss function. In addition, a second loss function 820 can be used to evaluate the generated segmentation map 818 with respect to the ground truth segmentation map 809 associated with the input image, in which the segment 811 of the implanted defect 810 is labeled/circled, as illustrated. The ML model can be optimized (608) to reduce the difference between the predicted defect, as indicated by the defective segment in the segmentation map, and the ground truth of the implanted defect.

The training in the deterministic mode is performed in a similar manner as described above with reference to block 304 in FIG. 3. The nominal image in the image pair can be used as both the input image and the target image. The nominal image can be processed (610) by the ML model to obtain a predicted reference image with a predetermined PV selected from the PV distribution which is similar to the PV of the nominal image. The ML model can be optimized to reduce a difference between the predicted reference image and the nominal image itself. The nominal image can be then processed in the second branch via the second decoder 806, and the segmentation map 818 generated in such cases is should be a clean map without any defect segment. The segmentation map can be evaluated with respect to a corresponding clean ground truth segmentation map which indicates no presence of defects.

The ML model constructed and trained as such, when given a runtime image, can directly generate a segmentation map indicative of defect presence in the runtime image. Alternatively, the ML model can also be used to generate a reference image for the runtime image, which can be used for defect examination in the runtime image.

Figure 5:
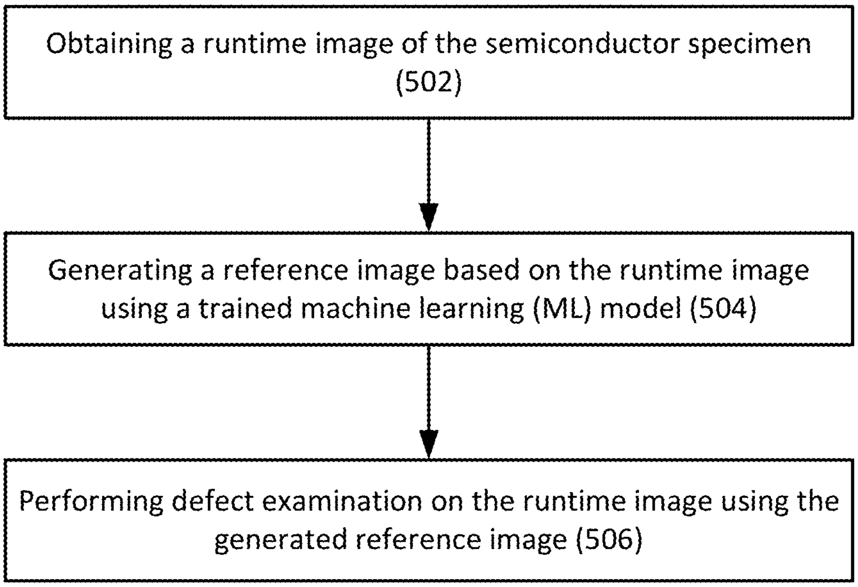
FIG. 5 shows a generalized flowchart of runtime defect examination on a semiconductor specimen using a trained ML model in accordance with certain embodiments of the presently disclosed subject matter.

Turning now to FIG. 5, there is illustrated a generalized flowchart of runtime defect examination on a semiconductor specimen using a trained ML model in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to images of a given processing step/layer of the sampled set of processing steps. Those skilled in the art will readily appreciate that the teachings of the presently disclosed subject matter, such as the process of machine-learning based examination, can be performed following any layer and/or processing steps of the specimen. The present disclosure should not be limited to the number of layers comprised in the specimen and/or the specific layer(s) to be examined.

A runtime image of a semiconductor specimen can be obtained (502) (e.g., acquired by the examination tool 120) during runtime examination of the specimen. A semiconductor specimen here can refer to a semiconductor wafer, a die, or parts thereof, that is fabricated and examined in the fab during a fabrication process thereof. An image of a specimen can refer to an image capturing at least part of the specimen. By way of example, an image can capture a target region or a target structure (e.g., a structural feature or pattern on a semiconductor specimen) that is of interest to be examined on a semiconductor specimen. For instance, the image can be an electron beam (e-beam) image acquired by an electron beam tool in runtime during in-line examination of the semiconductor specimen.

The runtime image can be processed by a trained ML model (e.g., by the ML model 106) to generate (504) a reference image corresponding to the runtime image. The ML model is previously trained during a training/setup phase, as described above with respect to FIGS. 2-4 and 6. Specifically, the ML model is previously trained alternately between two training modes using a training set: a stochastic mode where the ML model is configured to generate a predicted reference image with a stochastic pattern variation (PV) from a PV distribution, and a deterministic mode where the ML model is configured to generate a predicted reference image with a predetermined PV selected from the PV distribution. The PV distribution is learnt by the ML model based on PVs observed across the training set.

Defect examination can be performed (506) (e.g., by the defect examination module 108) on the runtime image using the generated reference image. By way of example, defect examination can be performed by directly comparing the runtime image with the generated reference image to obtain a defect examination result indicative of defect distribution on the semiconductor specimen. The defect examination can refer to one or more of the following operations: defect detection, defect review, and defect classification. The ML model can be used for generating a reference image in any of these operations, as detailed below.

As described above, defect detection refers to capturing inspection images of a specimen and detecting potential defects based on the images in accordance with a defect detection algorithm, such as, e.g., in D2D inspection. For each inspection image, the trained ML model can process it and generate a corresponding reference image. The reference image can be used to be compared with the inspection image, giving rise to a defect map indicative of defect candidate distribution on the semiconductor specimen. In some cases, a list of defect candidates can be further selected from the defect map as candidates having higher probability to be defects of interest (DOI).

After defect detection, the defect candidates can be provided to a defect review tool (such as, e.g., ADR). The review tool is configured to capture review images (typically with higher resolution) at locations of the respective defect candidates, and review the review images for ascertaining whether a defect candidate is indeed a DOI. Similarly, in such cases, the trained ML model can be used to process a review image and generate a corresponding reference image. The reference image can be used to be compared with the review image. The output of the review tool can include label data respectively associated with the defect candidates, the label data being informative of whether each defect candidate is a DOI.

In some cases, a defect classification tool (such as, e.g., ADC) is used in addition to the defect review (DR) tool or in lieu of the DR tool. By way of example, the classification tool can provide label data informative of whether each defect candidate is a DOI, and for those labelled as DOIs, also the classes or the types of the DOIs. The trained ML model can be used here in a similar manner.

As described above, the ML model trained under the alternate training modes can learn to recognize all PVs as normal behaviors, thereby differentiating the defective features from the normal behaviors. In addition, for a given input image, the model can learn to generate a reference image with similar PV with respect to the input image.

The ML model, once trained in this specific training process and deployed for runtime defect examination, can effectively remove defective features from a runtime image, and generate a reference image having the same PV as the runtime image. Such a reference image, when being used in comparison with the runtime image, can result in an improved difference map where residual noises and variations caused by process variations are significantly reduced, thus improving defect detection sensitivity.

In some embodiments, the generation of a reference image using the ML model, as described with reference to block 504, can be repeated a plurality of times, so as to obtain a plurality of reference images with stochastic PVs. A composite reference image can be generated based on the plurality of reference images, e.g., by combining/averaging the plurality of reference images in various ways. For instance, in some cases, the composite image can be generated by selecting, for each pixel, a smallest value of corresponding pixel values from the plurality of reference images. The selected value for each pixel constitutes the composite image. The composite reference image can further eliminate residual variations and noises between the reference image and the runtime image, thus possessing an even closer PV to the PV of the runtime image. The defect examination can be performed on the runtime image using the composite reference image.

In some embodiments, a segmentation map can be generated by the trained ML model, in addition to, or in lieu of the reference image. The segmentation map includes a segment representative of defect presence. As described above with reference to FIGS. 6 and 8, the ML model in such cases can comprise an encoder, a first decoder, and a second decoder operatively connected to the encoder and the first decoder. The reference image can be obtained as the output of the first decoder, and the segmentation map can be obtained as the output of the second decoder. As described with reference to FIGS. 6 and 8, the training set used to train such a ML model comprises at least one pair of a nominal image and a synthetic defective image generated by implanting a defect to the nominal image.

It is to be noted that examples illustrated in the present disclosure, such as, e.g., the exemplified ML models, the loss functions, the defect examination applications, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is that, instead of additional image acquisition of an actual reference image, there is provided a machine learning model capable of generating a synthetic reference image for a runtime image, and using the generated reference image to perform defect examination operations. The proposed system significantly reduces the image acquisition time of the examination tool.

Among further advantages of certain embodiments of the presently disclosed subject matter as described herein is that the ML model trained under the specific alternate training modes can learn to recognize all PVs as normal behaviors thereby differentiating the defective features from the normal behaviors. In addition, for a given input image, the model can learn to generate a reference image with similar PV with respect to the input image.

The ML model, once trained in this specific training process and deployed for runtime defect examination, can effectively remove defective features from a runtime image, and generate a reference image having a high probability of being defect-free, while sharing similar a PV as that of the runtime image. Such a reference image, when being used in comparison with the runtime image, can result in an improved difference map where residual noises caused by process variations are significantly reduced, thus improving defect detection sensitivity.

Among further advantages of certain embodiments of the presently disclosed subject matter as described herein is possibly providing, by the trained ML model, an output of a segmentation map, in addition to or in lieu of the reference image. The segmentation map can provide direct indication of defect presence. The ML model in such cases is specifically constructed to comprise an encoder, a first decoder, and a second decoder operatively connected to the encoder and the first decoder, and is specifically trained as described above. The reference image can be obtained as the output of the first decoder, and the segmentation map can be obtained as the output of the second decoder.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "providing", "training", "using", "generating", "performing", "optimizing", "selecting", "enabling", "comparing", "repeating", "implanting", "evaluating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the defect examination system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification, are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed/tested, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system for defect examination on a semiconductor specimen, the system comprising a processing circuitry configured to:
- obtain a runtime image of the semiconductor specimen;
- generate a reference image based on the runtime image using a machine learning (ML) model, wherein the ML model is previously trained alternately between two training modes using a training set, the ML model learning a pattern variation (PV) distribution based on PVs observed across the training set, the two training modes comprising:
  - a stochastic mode where the ML model is configured to generate a predicted reference image with a stochastic pattern variation (PV) from the PV distribution, wherein the ML model is trained to treat all PVs within the PV distribution as normal and differentiate defective features therefrom, and
  - a deterministic mode where the ML model is configured to generate a predicted reference image with a predetermined PV selected from the PV distribution, wherein the ML model is trained to generate a reference image sharing a similar PV as of an input image of the ML model; and
- perform defect examination on the runtime image using the generated reference image.

2. The computerized system according to claim 1, wherein the training set comprises one or more pairs of training images, each pair including a defective image as an input image and a corresponding nominal image as a target image, or two nominal images having different PVs respectively as an input image and a target image.

3. The computerized system according to claim 2, wherein the training comprises, for a given pair of training images:
- in a stochastic mode, generating, by the ML model, a predicted reference image with a stochastic PV from a PV distribution based on the input image, and optimizing the ML model based on the predicted reference image with respect to the target image; and in a deterministic mode, generating, by the ML model, a predicted reference image with a predetermined PV selected from the PV distribution based on the target image, and optimizing the ML model based on the predicted reference image with respect to the target image.

4. The computerized system according to claim 1, wherein the ML model is a probabilistic generative model.

5. The computerized system according to claim 1, wherein the stochastic PV is randomly selected from the PV distribution, and the predetermined PV is selected as a center of the PV distribution so as to be similar to a PV in an input image to the ML model.

6. The computerized system according to claim 1, wherein the reference image shares a similar PV as that of the runtime image, and the processing circuitry is configured to perform the defect examination by directly comparing the runtime image with the reference image to obtain a defect examination result indicative of defect distribution on the semiconductor specimen, wherein the defect examination result has reduced residual PVs and improved detection sensitivity.

7. The computerized system according to claim 1, wherein the processing circuitry is configured to repeat the generation of a reference image using the ML model a plurality of times, to obtain a plurality of reference images with stochastic PVs, and generate a composite reference image based on the plurality of reference images, and wherein the defect examination is performed on the runtime image using the composite reference image.

8. The computerized system according to claim 7, wherein the composite reference image is generated by selecting, for each pixel, a smallest value of corresponding pixel values from the plurality of reference images.

9. The computerized system according to claim 1, wherein the processing circuitry is further configured to generate, using the ML model, a segmentation map for the runtime image, the segmentation map including a segment representative of defect presence in the runtime image.

10. The computerized system according to claim 9, wherein the ML model comprises an encoder, a first decoder, and a second decoder connected to the encoder and the first decoder, wherein the reference image is obtained as output of the first decoder, and the segmentation map is obtained as output of the second decoder.

11. The computerized system according to claim 2, wherein the one or more pairs of training images further comprise at least a pair of a nominal image and a synthetic defective image generated by implanting a defect to the nominal image.

12. A computerized method of training a machine learning (ML) model usable for defect examination on a semiconductor specimen, the method comprising:

obtaining a training set comprising one or more pairs of training images, each pair including an input image and a target image corresponding to the input image; and training the ML model alternately between two training modes using the training set, comprising, for a given pair of training images:

in a stochastic mode, generating, by the ML model, a predicted reference image with a stochastic pattern variation (PV) from a PV distribution based on the input image, and optimizing the ML model based on the predicted reference image with respect to the target image, wherein the ML model is trained to treat all PVs within the PV distribution as normal and differentiate defective features therefrom, and wherein the PV distribution is learnt by the ML model based on PVs observed across the training set; and in a deterministic mode, generating, by the ML model, a predicted reference image with a predetermined PV selected from the PV distribution based on the target image, and optimizing the ML model based on the predicted reference image with respect to the target image itself, wherein the ML model is trained to generate a reference image sharing a similar PV as of an input image of the ML model.

13. The computerized method according to claim 12, wherein each pair of training images includes a defective image as an input image and a corresponding nominal image as a target image, or two nominal images having different process variations (PV) respectively as an input image and a target image.

14. The computerized method according to claim 13, wherein the one or more pairs comprise at least a pair of a defective image and a nominal image corresponding to the defective image, and the training comprises:

in the stochastic mode, processing the defective image by the ML model to obtain a predicted reference image with a stochastic PV from the PV distribution, and optimizing the ML model to reduce a difference between the predicted reference image and the nominal image; and in the deterministic mode, processing the nominal image by the ML model to obtain a predicted reference image with a predetermined PV selected from the PV distribution and similar to the PV of the nominal image, and optimizing the ML model to reduce a difference between the predicted reference image and the nominal image.

15. The computerized method according to claim 13, wherein the one or more pairs comprise at least a pair of a first nominal image and a second nominal image having different PVs, and the training comprises:

in the stochastic mode, processing the first nominal image by the ML model to obtain a predicted reference image with a stochastic PV from the PV distribution, and optimizing the ML model to reduce a difference between the predicted reference image and the second nominal image; and in the deterministic mode, processing at least one nominal image of the first nominal image or the second nominal image by the ML model to generate at least one predicted reference image with a predetermined PV selected from the PV distribution and similar to the PV of the at least one nominal image, and optimize the ML model to reduce a difference between the at least one predicted reference image and the at least one nominal image.

16. The computerized method according to claim 14, wherein the defective image is a synthetic defective image generated by implanting a defect to the corresponding nominal image, the synthetic defective image being associated with ground truth of the implanted defect.

17. The computerized method according to claim 16, wherein the ML model comprises an encoder, a first decoder, and a second decoder connected to the encoder and the first decoder, wherein the predicted reference image is obtained as output of the first decoder, and the training further comprises: obtaining, as output of the second decoder, a segmentation map including a segment representative of defect presence, and optimizing the ML model based on the segmentation map with respect to the ground truth.

18. A non-transitory computer readable storage medium tangibly embodying a program of instructions that, when executed by a computer, cause the computer to perform a method of defect examination on a semiconductor specimen, the method comprising:

obtaining a runtime image of the semiconductor specimen;

generating a reference image based on the runtime image using a machine learning (ML) model, wherein the ML model is previously trained alternately between two training modes using a training set, the ML model learning a pattern variation (PV) distribution based on PVs observed across the training set, the two training modes comprising:

i) a stochastic mode where the ML model is configured to generate a predicted reference image with a stochastic pattern variation (PV) from a PV distribution, wherein the ML model is trained to treat all PVs within the PV distribution as normal and differentiate defective features therefrom, and ii) a deterministic mode where the ML model is configured to generate a predicted reference image with a predetermined PV selected from the PV distribution, wherein the ML model is trained to generate a reference image sharing a similar PV as of an input image of the ML model; and performing defect examination on the runtime image using the generated reference image.

* * * * *